United States Patent
Smith

(10) Patent No.: US 9,809,260 B2
(45) Date of Patent: Nov. 7, 2017

(54) SEGMENTED TRAILER SIDE SKIRT FAIRING

(71) Applicant: Jeffrey P. Smith, Prosper, TX (US)

(72) Inventor: Jeffrey P. Smith, Prosper, TX (US)

(73) Assignee: PACCAR Inc., Bellevue, WA (US)

( * ) Notice: Subject to any disclaimer, the term of this patent is extended or adjusted under 35 U.S.C. 154(b) by 0 days.

(21) Appl. No.: 13/787,278

(22) Filed: Mar. 6, 2013

(65) Prior Publication Data

US 2014/0252799 A1 Sep. 11, 2014

(51) Int. Cl.
*B62D 35/00* (2006.01)

(52) U.S. Cl.
CPC .................. *B62D 35/001* (2013.01)

(58) Field of Classification Search
CPC .................................. B62D 35/001
USPC .................. 296/180.4, 180.1; 280/432, 768; 180/116, 127
See application file for complete search history.

(56) References Cited

U.S. PATENT DOCUMENTS

| | | | |
|---|---|---|---|
| 4,611,847 A | 9/1986 | Sullivan | |
| 6,068,446 A * | 5/2000 | Tangler | F03D 1/0641 416/223 R |
| 6,932,419 B1 | 8/2005 | McCullough | |
| 7,517,004 B2 * | 4/2009 | Honeycutt | B62D 35/007 296/180.1 |
| 7,578,541 B2 | 8/2009 | Layfield | |
| 7,740,303 B2 | 6/2010 | Wood | |
| 7,748,772 B2 | 7/2010 | Boivin | |
| 7,789,453 B2 | 9/2010 | Roush | |
| 7,828,268 B2 * | 11/2010 | Teague, Jr. | 251/288 |
| 7,887,120 B2 | 2/2011 | Boivin | |
| 7,950,721 B1 * | 5/2011 | Peterson | 296/180.4 |
| 7,992,923 B2 * | 8/2011 | Dayton | B62D 35/001 296/180.1 |
| D649,090 S | 11/2011 | Boivin | |
| 8,087,715 B2 | 1/2012 | Andrus | |
| 8,177,286 B2 | 5/2012 | Brown | |
| 2010/0264690 A1 * | 10/2010 | Brown et al. | 296/180.4 |
| 2011/0068605 A1 | 3/2011 | Domo | |
| 2011/0175396 A1 | 7/2011 | Boivin | |
| 2011/0204677 A1 | 8/2011 | Wood | |
| 2011/0233960 A1 | 9/2011 | Heinz | |
| 2011/0272964 A1 | 11/2011 | Henderson | |
| 2012/0032475 A1 | 2/2012 | Grandominico | |
| 2012/0074728 A1 | 3/2012 | Senatro | |
| 2012/0319428 A1 * | 12/2012 | Wood | 296/180.4 |

FOREIGN PATENT DOCUMENTS

EP 2362068 A1 * 8/2011

* cited by examiner

*Primary Examiner* — Joseph D Pape
*Assistant Examiner* — Dana Ivey
(74) *Attorney, Agent, or Firm* — Christensen O'Connor Johnson Kindness PLLC

(57) ABSTRACT

To improve the aerodynamic efficiency of a vehicle trailer, one or more aerodynamic components are positioned on the trailer. In some examples described herein, the one or more aerodynamic components are in the form of side skirt fairing segments, which are positioned underneath the trailer and forward of the wheel assembles. In use, the one or more side skirt fairing segments improve air flow underneath the trailer and in the vicinity of the wheel assemblies, thereby reducing drag.

18 Claims, 4 Drawing Sheets

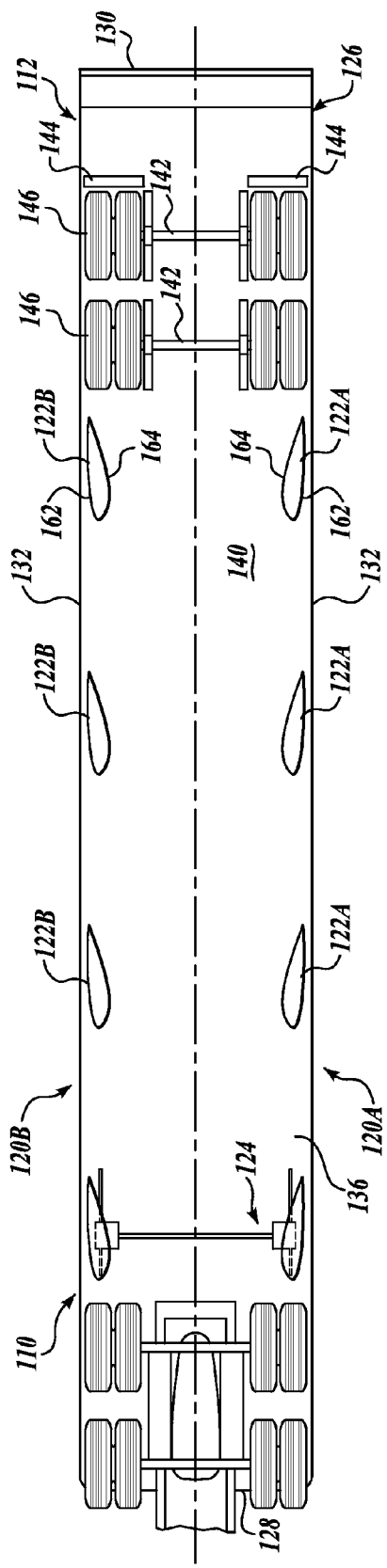

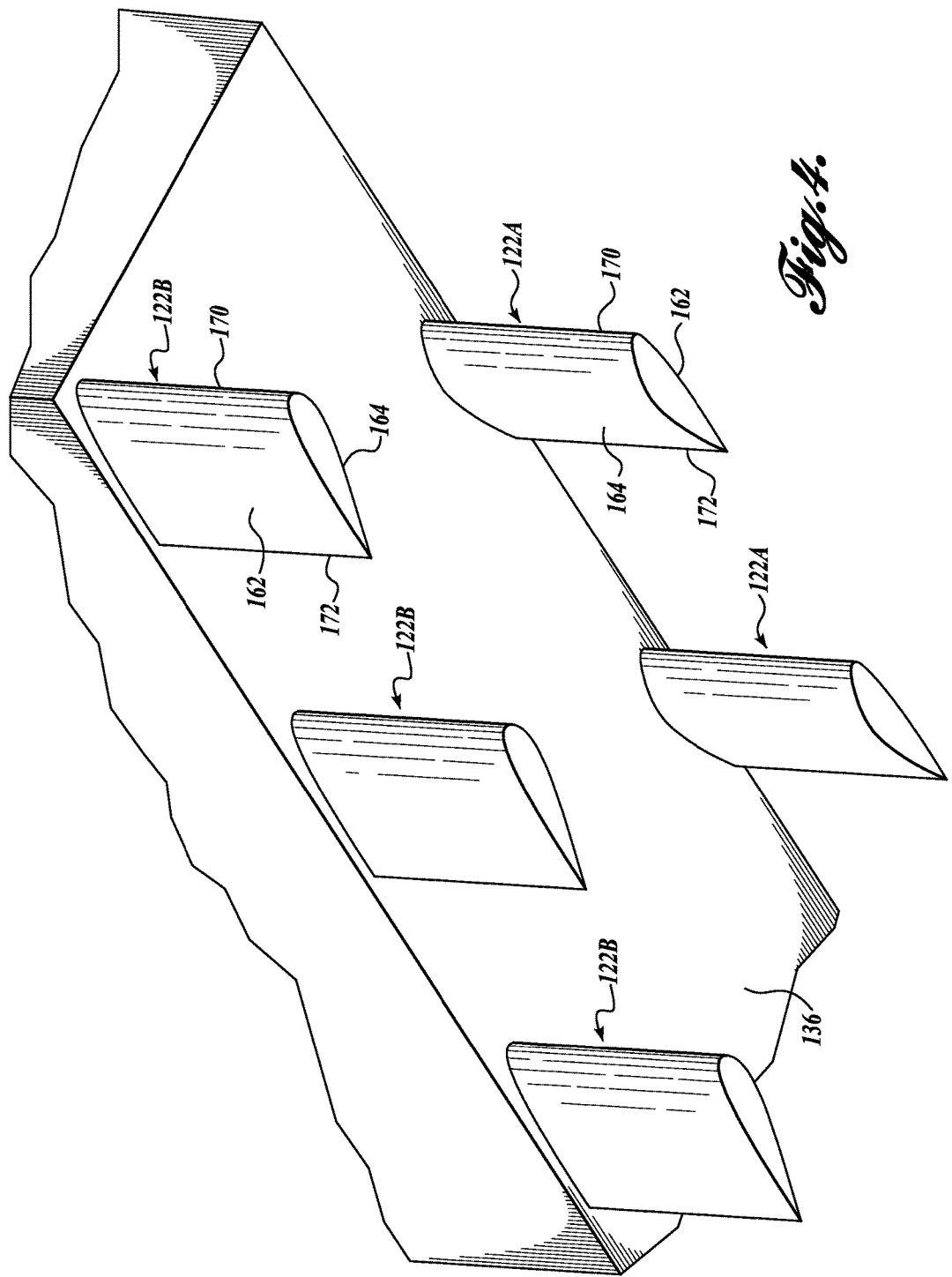

SEGMENTED TRAILER SIDE SKIRT FAIRING

BACKGROUND

Numerous means have been sought to improve the fuel-efficiency of moving bodies and, especially, moving bluff bodies by reducing their aerodynamic drag. In the field of surface transportation and, particularly in the long-haul trucking industry, even small improvements in fuel efficiency can reduce annual operating costs significantly. It is therefore advantageous in the design of a vehicle to reduce drag forces, thereby increasing the aerodynamic properties and efficiency of the vehicle.

The over-the-highway cargo-hauling tractor-trailer combination is one vehicle that experiences excessive aerodynamic drag. Generally described, tractor-trailer combinations typically include a tractor 18 having a so-called fifth wheel by which a box-like semi-trailer 24 may be attached to the tractor 18 by an articulated connection for transportation of the cargo trailer, as shown in FIG. 1. The shape of the conventional cargo trailer is essentially a rectangular box having a flat, rectangular roof 38 and matching floor 40, along with flat, rectangular side panels 42. The fore and aft vertical surfaces 44 and 46 of such trailers are also generally flat rectangular surfaces. The aft section of the trailer 24 is supportably mounted on one or more wheel assemblies, illustrated as 52 and 54.

Most large long-haul cargo trailers similar to those described above exhibit less than optimal aerodynamic performance during highway operation. At highway speeds, these conventional trailers develop a substantial amount of turbulent airflow in the region between the axles of the wheel assembles below the trailer box. This turbulence results in significant aerodynamic drag, increasing both fuel consumption and Nitrogen Oxide (NOx) emissions of the tractor 18.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with aspects of the present disclosure, a vehicle trailer is provided. The vehicle trailer includes a trailer body having a bottom wall, rear wheel assemblies disposed in a supporting relationship with respect to the trailer body, and two or more spaced apart side skirt fairing segments associated with the trailer body and positioned underneath the bottom wall of the trailer body and forward of the rear wheel assemblies. In some embodiments, each of the two or more side skirt fairing segments include inner and outer side surfaces, a leading edge, and a trailing edge.

In accordance with another aspect of the present disclosure, a vehicle trailer is provided. The vehicle trailer includes a trailer body having a bottom wall, first and second longitudinally extending sides, and an aft section, rear wheel assemblies disposed in a supporting relationship with respect to the aft section of the trailer body, and a first set of spaced apart side skirt fairing segments associated with the first longitudinally extending side of the trailer body and position forward of the rear wheel assemblies. In some embodiments, each of the side skirt fairing segments of the set of spaced apart side skirt fairing segments include first and second side surfaces, a leading edge, and a trailing edge. The vehicle trailer also includes a second set of spaced apart side skirt fairing segments associated with the second longitudinally extending side of the trailer body and position forward the rear wheel assemblies. In some embodiments, each of the side skirt fairing segments of the set of spaced apart side skirt fairing segments include first and second side surfaces, a leading edge, and a trailing edge.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 is a bottom view of the cargo-type trailer of FIG. 2 showing the aerodynamic (e.g., drag reducing) system; and FIG. 4 is a partial, bottom perspective view of one example a cargo-type trailer incorporating one embodiment of the aerodynamic system according to aspects of the present disclosure.

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The following discussion provides examples of systems and methods for improving the aerodynamic efficiency (e.g., reduce drag) of vehicles, such as class 8 tractor-trailer combinations. To improve the aerodynamic efficiency of the combination, examples described herein provide one or more aerodynamic components positioned on the trailer. In some examples described herein, the one or more aerodynamic components are in the form of side skirt fairing segments, which are positioned underneath the trailer and forward of the wheel assembles. In use, the one or more side skirt fairing segments improve air flow underneath the trailer and in the vicinity of the wheel assemblies, thereby reducing drag.

Although embodiments of the present disclosure will be described with reference to a cargo trailer, one skilled in the relevant art will appreciate that the disclosed embodiments are illustrative in nature, and therefore, should not be construed as limited to applications with a cargo trailer. It should therefore be apparent that the methods and systems of the present disclosure have wide application, and may be used in any situation where a reduction in the drag forces on a bluff body and/or wheel assembles is desirable.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Figure 1:
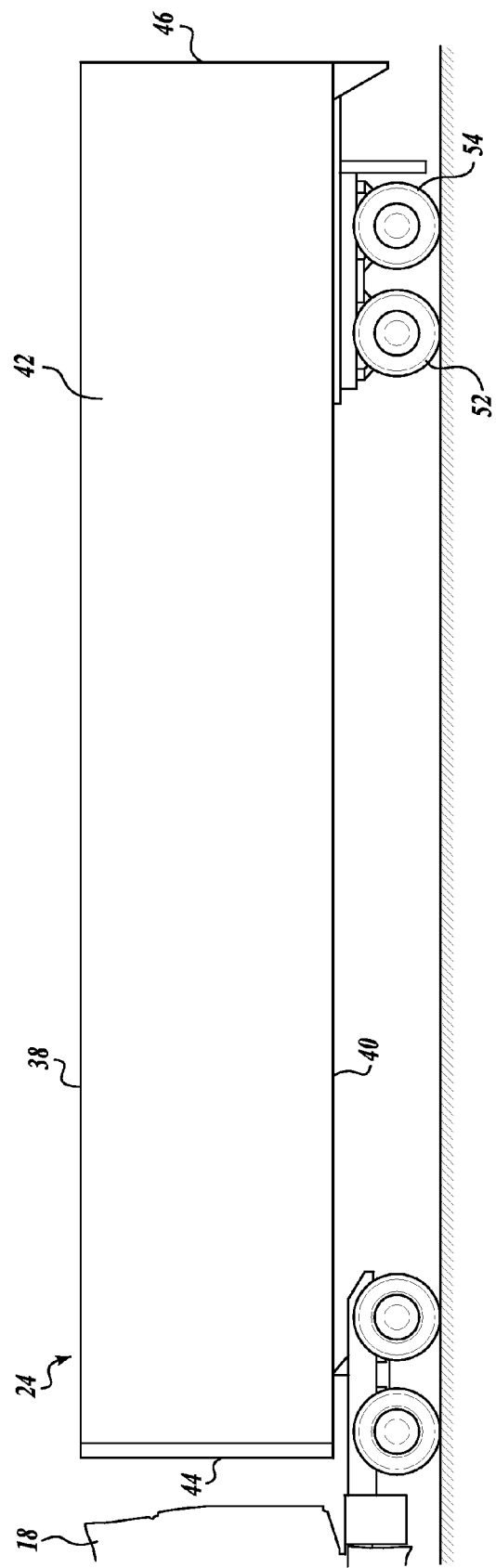
FIG. 1 is side view of a conventional cargo-type trailer.
Figure 2:
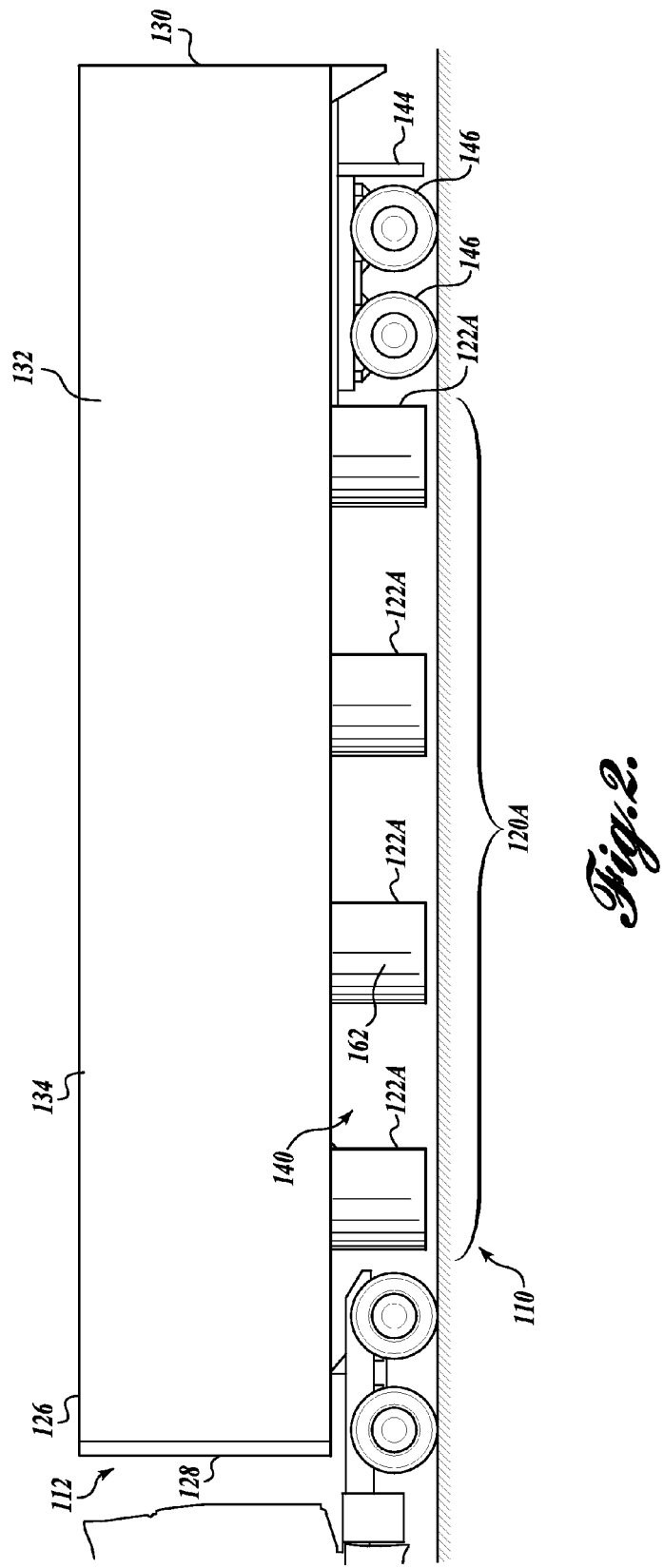
FIG. 2 is a left side view of one example of an aerodynamic (e.g., drag reducing) system mounted or otherwise positioned adjacent the underside of a cargo-type trailer, according to aspects of the present disclosure.

FIG. 2 illustrates a left side view of one example of an aerodynamic (e.g., drag reducing) system, generally denoted 110, mounted or otherwise positioned adjacent the underside of a cargo-type trailer 112, according to aspects of the present disclosure. As best shown in FIG. 2, the system 110 includes first and second sets 120A, 120B of one or more aerodynamic components 122, such as fairings. FIG. 2 shows the left-side components 120A of the system 110. It should be noted that the structures and arrangements of the depicted left-side components 120A can be a mirror of the right-side components 120B. It is noted that the drawings and descriptions of the left-side components 120A are equally applicable to the embodiments at both sides of cargo-type trailer 122.

Generally described, the one or more aerodynamic (e.g., drag reducing) components 122 of the first and second sets 120A, 120B include one or more trailer side skirt fairing segments that traverse longitudinally below the lateral boundaries of the trailer 112 in a spaced-apart manner, as best shown in FIG. 3. The one or more aerodynamic components 122 may be mounted via mounting assemblies 124 (only one is depicted in FIG. 3 for ease of illustration). In some embodiments, the one or more aerodynamic components 122 may include one or two trailer side skirt fairing segments, and in other embodiments, the one or more aerodynamic components 122 may include three or four trailer side skirt fairing segments.

As best shown in FIGS. 2 and 3, the trailer 112 includes a trailer body 126 that define a cargo carrying interior cavity (not shown). In the embodiment shown, the trailer body 126 is generally rectangular in shape, having a generally planar, vertically oriented front and rear end panels 128 and 130, generally planar, vertically oriented side panels 132, a generally planar top panel 134, and a generally planar bottom panel, sometimes referred to as a cargo-supporting floor deck 136. The undercarriage 140 of the trailer 112 is comprised of groupings of various drag-producing components, which generally reside below a cargo-supporting floor deck 136. The drag-producing components of a semi-type cargo trailer undercarriage customarily include rear axles 142, mud flaps 144, tires 146, and other components, such as brake components and longitudinal and transverse structural support members not shown for ease of illustration but well known in the art.

Each set 120A and 120B of the one or more aerodynamic components 122 is mounted fore of the rear axles 142 of the trailer 112, as best shown in FIGS. 2-3. In that regard, and as will be described in more detail below, each aerodynamic component 122 aims to direct air away from the central regions of the undercarriage 140 of trailer 112, which may contain the majority of such drag-producing components. Such directional control of airflow during transport operations aims to reduce the drag-producing interactions between the air and the above-noted structures. In some embodiments, the aerodynamic components 122 direct the aft moving air stream outwardly of the trailer tires 146.

In order to reduce the drag-producing interactions between the air and the above-noted structures, one or more of the aerodynamic components 122 in some embodiments are in the form of an air foil, as best shown in FIGS. 3 and 4. The air foils may take on many cambers according to embodiments of the present disclosure. In the embodiment shown in FIGS. 2 and 3, each air foil includes a pressure surface 162 and a suction surface 164 that converge fore and aft at leading and trailing edges 170 and 172, respectively. In the embodiment shown, the pressure surface 162 is defined by a generally straight side and the suction surface 164 is defined by a curved side, although other cambers may be practiced with embodiments of the present disclosure. Thus, it will be appreciated that the generally straight side may have some curvature along a portion thereof or substantially all thereof.

When positioned with respect to the trailer 112, the pressure surface 162 faces generally laterally outwardly of the trailer 112 and the suction surface 164 faces generally laterally inwardly. As such, during movement of the trailer 112, air flow rearwardly would progress at a higher velocity along the suction surface 164 (e.g., the upper camber side) as compared to the air flow along the pressure surface 162 (e.g., lower camber side) which in turn, aids in directing the air flow laterally outwardly of the wheels 146 and other drag producing components of the trailer 112.

In some embodiments, the chord line of one or more of the air foils can be generally parallel to the longitudinal axis of the trailer, and in other embodiments, the chord line of one or more of the air foil may have a yaw angle of about 1-10, in yet other embodiments, about 2-3 degrees, with respect to the longitudinal axis of the trailer. The aerodynamic components 122 can be spaced equidistant from one another along each side of the trailer 112 or may have varying distances in-between them. In some embodiments, the aftmost aerodynamic components 122 can be mounted in close proximity of the fore mounted tires 146, as best shown in FIGS. 2-3. Further, the respective aerodynamic components 122 of sets 120A and 120B may or may not be laterally aligned.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A vehicle trailer having a longitudinal axis, comprising:
a trailer body having a bottom wall;

rear wheel assemblies disposed below the trailer body; and two or more side skirt fairing segments spaced apart from each other in a longitudinal direction in order to allow air to flow therebetween, the two or more side skirt fairing segments being associated with the trailer body and positioned underneath the bottom wall of the trailer body and forward of the rear wheel assemblies, wherein each of the two or more side skirt fairing segments includes inner and outer side surfaces, a leading edge, and a trailing edge arranged in the form of an air foil such that the outer side surface and the inner side surface converge at each of the leading edge and the trailing edge, and wherein each of the two or more side skirt fairing segments is positioned such that the leading edge and the trailing edge extend vertically underneath the bottom wall of the trailer body and such that a chord line from the leading edge to the trailing edge is at an angle of approximately 1-10 degrees with respect to the longitudinal axis of the vehicle trailer.

2. The vehicle trailer of claim 1, wherein the two or more side skirt fairing segments are positioned along one side of the trailer body as the trailer extends rearwardly toward the rear wheel assemblies.

3. The vehicle trailer of claim 2, further comprising two or more side skirt fairing segments positioned along the other side of the trailer body as the trailer extends rearwardly toward the rear wheel assemblies.

4. The vehicle trailer of claim 1, wherein the side skirt fairing segments are uniformly, longitudinally spaced as the trailer extends rearwardly toward the rear wheel assemblies.

5. The vehicle trailer of claim 1, wherein the side skirt fairing segments comprise three or more side skirt fairing segments, and wherein the side skirt fairing segments are non-uniformly, longitudinally spaced as the trailer extends rearwardly toward the rear wheel assemblies.

6. The vehicle trailer of claim 1, wherein the outer side surface of each of the two or more side skirt fairing segments is a generally straight surface and the inner side surface of each of the two or more side skirt fairing segments is a curved surface.

7. The vehicle trailer of claim 6, wherein at least a portion of the generally straight surface has some curvature.

8. The vehicle trailer of claim 1, wherein the leading edge of each of the two or more side skirt fairing segments is closer to the longitudinal axis than the trailing edge.

9. A vehicle trailer having a longitudinal axis, comprising:
a trailer body having a bottom wall;
rear wheel assemblies disposed below the trailer body; and
two or more spaced apart side skirt fairing segments associated with the trailer body and positioned underneath the bottom wall of the trailer body and forward of the rear wheel assemblies, wherein each of the two or more side skirt fairing segments includes inner and outer side surfaces, a leading edge, and a trailing edge;
wherein the inner and outer side surfaces, the leading edge, and the trailing edge of the two or more side skirt fairing segments are in the form of an air foil,
wherein the outer side surface includes a pressure surface of the air foil and the inner side surface includes a suction surface of the air foil such that the pressure surface and the suction surface converge at each of the leading edge and the trailing edge, and
wherein each of the two or more spaced apart side skirt fairing segments is positioned such that the leading edge and the trailing edge extend vertically underneath the bottom wall of the trailer body and such that a chord line from the leading edge to the trailing edge is at an angle of approximately 1-10 degrees with respect to the longitudinal axis of the vehicle trailer.

10. The vehicle trailer of claim 9, wherein the outer side surface of each of the two or more spaced apart side skirt fairing segments is a generally straight surface and the inner side surface of each of the two or more spaced apart side skirt fairing segments is a curved surface.

11. The vehicle trailer of claim 10, wherein at least a portion of the generally straight surface has some curvature.

12. The vehicle trailer of claim 9, wherein the leading edge of each of the two or more spaced apart side skirt fairing segments is closer to the longitudinal axis than the trailing edge.

13. A vehicle trailer, comprising:
a trailer body having a bottom wall, first and second longitudinally extending sides, and an aft section;
rear wheel assemblies disposed below the aft section of the trailer body;
a first set of longitudinally, spaced apart side skirt fairing segments associated with the first longitudinally extending side of the trailer body and positioned forward of the rear wheel assemblies, wherein air gaps are between respective longitudinally, spaced apart side skirt fairing segments, and wherein each of the side skirt fairing segments of the first set of spaced apart side skirt fairing segments includes first and second side surfaces, a leading edge, and a trailing edge; and
a second set of longitudinally, spaced apart side skirt fairing segments associated with the second longitudinally extending side of the trailer body and positioned forward the rear wheel assemblies, wherein air gaps are between respective longitudinally, spaced apart side skirt fairing segments, and wherein each of the side skirt fairing segments of the second set of spaced apart side skirt fairing segments includes first and second side surfaces, a leading edge, and a trailing edge;
wherein, for each of the side skirt fairing segments, the first and second side surfaces, the leading edge, and the trailing edge are in the form of an air foil such that the first side surface and the second side surface converge at each of the leading edge and the trailing edge; and
wherein each of the side skirt fairing segments is positioned such that the leading edge and the trailing edge extend vertically underneath the bottom wall of the trailer body and such that a chord line from the leading edge to the trailing edge is at an angle of approximately 1-10 degrees with respect to a longitudinal axis of the vehicle trailer.

14. The vehicle trailer of claim 13, wherein the first side surface faces generally outwardly of the trailer body and includes a pressure surface of the air foil, wherein the second side surface faces generally inwardly of the trailer body and includes a suction surface of the air foil.

15. The vehicle trailer of claim 13, wherein the rearward most side skirt fairing segment of the first and second sets of spaced apart side skirt fairing segments being positioned just fore of the respective wheel assemblies.

16. The vehicle trailer of claim 13, wherein an outer one of the first and second side surfaces of each of the side skirt fairing segments is a generally straight surface and an inner one of the first and second side surfaces of each of the side skirt fairing segments is a curved surface.

17. The vehicle trailer of claim 16, wherein at least a portion of the generally straight surface has some curvature.

18. The vehicle trailer of claim 13, wherein the leading edge of each of the side skirt fairing segments is closer to the longitudinal axis than the trailing edge.

* * * * *